United States Patent [19]
Gallipeau et al.

[11] Patent Number: 5,652,661
[45] Date of Patent: Jul. 29, 1997

[54] HIGH SPEED PHOTOGRAPHIC PRINTER USING OPTICAL AND DIGITAL PRINTING WITH AN ACTIVE MATRIX LCD

[75] Inventors: Brian Keith Gallipeau; Curtis Edward DeWolff, both of Fairport, N.Y.

[73] Assignee: Eastman Kodak Company, Rochester, N.Y.

[21] Appl. No.: 478,707

[22] Filed: Jun. 7, 1995

[51] Int. Cl.⁶ .............................. H04N 1/21; H04N 5/84
[52] U.S. Cl. ............................................................ 358/302
[58] Field of Search ................................ 358/301, 302, 358/350, 351, 501; 353/30, 31, 32; 362/3; 355/40, 32, 37

[56] References Cited

U.S. PATENT DOCUMENTS

| | | |
|---|---|---|
| 3,756,718 | 9/1973 | Letzer . |
| 3,761,171 | 9/1973 | Fields ........................... 355/3 |
| 4,185,904 | 1/1980 | Eddy . |
| 4,297,022 | 10/1981 | Lester . |
| 4,810,058 | 3/1989 | Sangyoji . |
| 4,933,710 | 6/1990 | Beaulieu et al. ............ 355/38 |
| 4,933,754 | 6/1990 | Reed et al. .................. 358/76 |
| 5,047,789 | 9/1991 | Kanayama et al. . |
| 5,050,001 | 9/1991 | Hatanaka et al. ........... 358/302 |
| 5,084,727 | 1/1992 | Maronian et al. .......... 355/68 |
| 5,099,273 | 3/1992 | Yamamoto et al. . |
| 5,126,863 | 6/1992 | Otsuka et al. . |
| 5,184,227 | 2/1993 | Foley . |
| 5,295,006 | 3/1994 | Lee . |
| 5,400,152 | 3/1995 | Manico et al. ............. 358/501 |
| 5,408,344 | 4/1995 | Takiguchi et al. ......... 359/40 |
| 5,428,366 | 6/1995 | Eichenlaub ................ 345/102 |

FOREIGN PATENT DOCUMENTS 0 629 908  12/1994  European Pat. Off. .

OTHER PUBLICATIONS

A. Mosley; "Liquid Crystal Display—An Overview"; Displays, vol. 4, No. 2, pp. 67–73 Mar. 16, 1993.

*Primary Examiner*—Peter S. Wong
*Assistant Examiner*—Gregory J. Toathey
*Attorney, Agent, or Firm*—Frank Pincelli

[57] ABSTRACT

A method and apparatus for printing an image on a photosensitive material. The apparatus includes a scanner for obtaining a digital record of an image and an active matrix liquid crystal display. The digital record produced by the scanner is such that the number of pixel elements and arrangement corresponds to the predetermined number and arrangement of the pixels of the active matrix liquid crystal display. The active matrix liquid crystal display produces an image in accordance with the digital record. An exposure system is also provided for exposing the image on the active matrix liquid crystal display onto a photosensitive material.

11 Claims, 4 Drawing Sheets

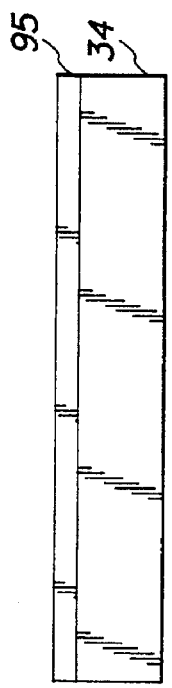
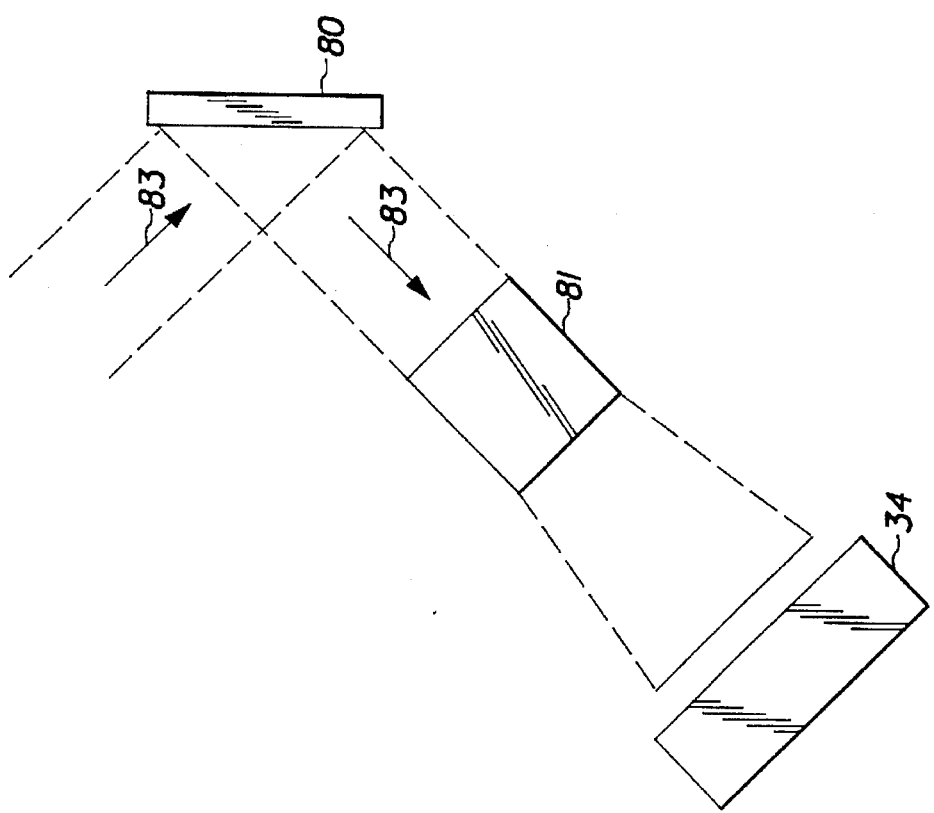
FIG.6
FIG.4

HIGH SPEED PHOTOGRAPHIC PRINTER USING OPTICAL AND DIGITAL PRINTING WITH AN ACTIVE MATRIX LCD

FIELD OF THE INVENTION

The invention relates generally to the field of photography and, in particular, to a high speed photographic printer.

BACKGROUND OF THE INVENTION

Traditional exposure of photographic paper in a photofinishing apparatus comprises the optical exposure of a photographic film negative onto photographic paper. Modifications to this image can be made by using a photographic mask which allows cropping or additional information to be rendered on the photosensitive material. In a typical photofinishing lab, the images are provided at a high rate onto the photosensitive paper in order to provide a low cost, high quality product. An example of a high speed optical photographic printer is the Clas 35 Printer sold by the Eastman Kodak Company. This device is capable of exposing approximately eight images per second.

While the foregoing printer is able to produce high quality prints at a relatively low cost, there are various drawbacks to such a system. Such devices are limited in the amount of enhancement that can be made to the print. Additionally, such devices are not suitable for providing index prints along with each individual order being processed. Typically, when index prints are required, information that has been obtained during the scanning step is forwarded on to a separate digital printer wherein the index print is produced. This obviously requires additional equipment and collation of the index print and the print order which it is associated with.

There has been suggested various methods for digitally rendering images on photosensitive material. For example, there has been suggested CRT (cathode ray tube printers) for printing of photographic paper. It has also been suggested the use of LEDs, such as disclosed in U.S. Ser. No. 08/123,839, entitled "Method and Apparatus for Exposing Photosensitive Media with Multiple Light Sources", filed Sep. 20, 1993, in the names of Douglas H. Smith, John F. Carson, Roy B. Ference, and Kevin J. Appel. However, a significant drawback with such devices is the amount of time necessary to produce a single image. Typically, CRT printers take about 4 to 8 seconds to produce a single image and LED printers take substantially longer periods of time. With respect to high speed photographic printing, such speeds are very slow.

There has also been suggested in the prior art the printing of photographic photosensitive material through the use of liquid crystal display devices. For example, U.S. Pat. No. 4,810,058 discloses a color liquid crystal device for printing images onto photosensitive material. However, in this device the liquid crystal display (LCD) is moved between three separate positions in order to provide exposure of the image. Due to the relative movement of the LCD, the quality in the image suffers significantly and requires a significant amount of time in which to produce the image an in-line printer that can provide the index print along with the order for which it is associated.

Applicants have invented a high speed color photographic printer which provides high quality color images at a high rate. Additionally, the photographic printer can be used in-line with conventional optical printers so that index prints can be made directly in-line and adjacent the order to which it is associated.

SUMMARY OF THE INVENTION

The present invention is directed to overcoming one or more of the problems set forth above. According to one aspect of the present invention, there is provided a high speed photographic printer comprising:

a scanner for obtaining a digital record of an image obtained from scanning an image;

an active matrix liquid crystal display having a predetermined number of pixels placed in a predetermined arrangement, the digital record produced by the scanner is such that the number of pixel elements and arrangement corresponds to the predetermined number and arrangement of the pixels of the active matrix liquid crystal display, the active matrix liquid crystal display capable of forming an image in accordance with the digital record; and an exposure system for exposing an image formed on the active matrix liquid crystal display onto a photosensitive material.

According to another aspect of the present invention, there is provided a method for printing an image on a photosensitive material, comprising the steps of:

providing a digital record representative of the image;

sending the digital record to an active matrix liquid crystal display such that an image is produced in accordance with the digital record; and exposing the image produced on the active matrix liquid crystal display onto a photosensitive material so as to form an image on the photosensitive material.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is another digital image exposing system for exposing a photosensitive material;

FIG. 6 is a front elevational view of a modified active motion liquid crystal display for use in the apparatus of FIG. 1.

DETAILED DESCRIPTION OF THE INVENTION

Figure 1:
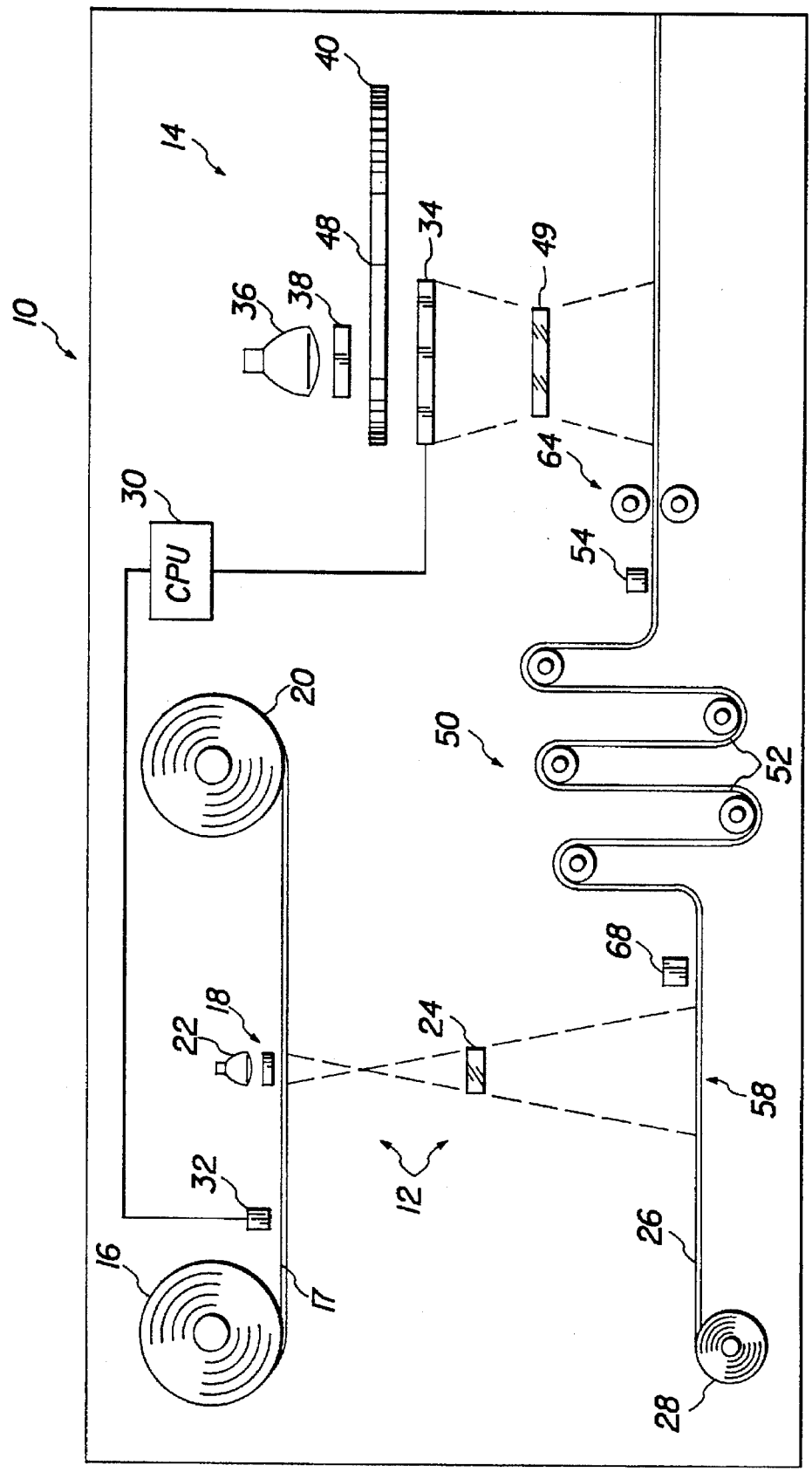
FIG. 1 is a diagrammatic representation of a printing apparatus made in accordance with the present invention.

Referring to FIG. 1, there is illustrated in schematic form a high speed printing apparatus 10 made in accordance with the present invention. In the embodiment illustrated, the high speed printing apparatus 10 includes an optical printing system 12 and digital printing system 14. The optical printing system includes a supply reel 16. In particular, the supply reel 16 comprises a plurality of strips of processed photographic film, each strip representing a single customer order) which have been spliced together so as to form a long continuous web 17. The optical printing system 12 includes a print gate 18 and take-up reel 20 for taking up web 17 after it has been exposed at gate 18. A light source 22 is provided at print gate 18 for exposing images onto web 17. A lens 24 is provided for focusing of the image onto photosensitive material 26, which in the particular embodiment illustrated, is photographic paper supplied by reel 28. A central processing unit (CPU) 30 is provided for controlling operation of apparatus 10 as is conventionally done in the art.

A digital scanner 32 is provided for scanning the images prior to exposure at print gate 18. The information obtained by scanner 32 is used to control printing at gate 18 as is customarily done in the prior art. In the particular embodiment illustrated, digital scanner 32 comprises a charged coupled device (CCD). Preferably the scan resolution of the CCD is equal to or greater than the resolution of the final printed image.

Digital printing system 14 is located with respect to the optical print system 12 so that additional images can be made on the photosensitive material 26 on which the optical system has exposed image. Preferably, as illustrated, the digital printing system 14 is provided in-line after the optical print system 12. In the embodiment illustrated, the optical print system 12 is able to produce prints at the rate of about eight images per second.

The digital printing system includes an active matrix liquid crystal display device 34 (AMLCD) which is used to provide images which can be exposed onto the photographic paper 26. In the particular embodiment illustrated, the active matrix liquid crystal display 34 comprises a monochromatic display having preferably a minimal number of pixels of 640 by 480. A suitable AMLCD may be purchased from the Sony Corporation, Part No. LCX007AL. In order to provide a high quality image, the number and arrangement of the pixel of the AMLCD 34 should correspond to the number and arrangement of the pixels in the CCD array. Preferably, this relationship is at least equal to 1 to 1. The system 14 includes a light source 36 and infrared cut-off filter 38 for eliminating the undesirable portion of the light spectrum such that only substantially visible light is being transmitted. A colored filter wheel 40 is provided between the monochromatic active matrix liquid crystal display 34 and the light source 36 which is used to form a color image on the photosensitive paper 26. In particular, the filter wheel 40 (see FIG. 2) comprises filter sections 42, 44, 46 wherein filter section 42 is a blue pass filter, filter section 44 is a red pass filter, and section 46 is a green pass filter. By rotating filter wheel 40 about axis 48, the desired colored filter section may be placed between the light source 36 and the active matrix liquid crystal display 34 so as to generate a colored image onto the photographic paper 26. Wheel 40 is also provided with an opaque section 47 so as to block light from light source 36 from exposing paper 26 during non-exposure times of the digital printing process. An appropriate lens 49 is provided for focusing of the image produced by AMLCD 34 onto the photographic paper 26. In particular, the images that are scanned by digital scanner 32 are sent on to the central processing unit 30 which provides the appropriate control and signals for the AMLCD 34.

In order to produce a single image on the photographic paper 26 by the digital printing system 14 it is necessary to rotate the filter wheel 40 and maintain the image on AMLCD 34 for an appropriate period of time so that each of the filter sections are exposed for the appropriate length of time. Applicants have found that when using the digital printing system, full color images can be formed on the photographic paper within about 0.25 seconds. This rate is approximately half the rate at which images may be formed by the optical printing system 12. In the particular embodiment illustrated, the digital printing system 14 is used to provide an index print of a particular customer order, in particular, as the web 17 is passed by scanner 32, image information is obtained with respect to each customer order. Because each order is separated by splices, which typically have machine readable order markings thereon, individual orders can be easily segregated and identified. In the particular embodiment illustrated, the scanner 32 scans an entire customer order and the information obtained is maintained in the central processing unit 30. Thus, for every particular customer order, all the images are stored in central processing unit 30 and are composed such so as to produce a single image in the form of an index print. Briefly, an index print is a single print wherein all of the individual prints which form the customer order are produced in a predetermined pattern, for example, the images are generally disposed in a plurality of rows and columns such that all of the images in that particular order can be viewed at once. Index prints are quite helpful in identifying quickly the images that are provided on the negative photographic film that is returned to the customer.

It is desirable to print the index print immediately adjacent the customer order in order to minimize handling and the need to later reunite the index print with the individual prints. In order to accomplish this, a take-up mechanism 50 is provided so that the photographic paper may be stopped at the appropriate time period, typically after all of the images of a particular customer order have been composed by the CPU 30 for printing. Since the rate at which the optical printing system 12 operates is faster than the printing rate of digital printing system 14, a take-up mechanism 50 is necessary so that appropriate take-up loops 52 may be formed in the web of photographic paper 26 so that the photographic paper can be stopped for printing of the index print by the digital printing system 14. Once the index print has been printed, the web 26 can be rapidly advanced out of the printer 10 whereby the take-up loops 52 are reduced in size. In this way the optical printing system can run continuously without having to wait for the digital printing system to print the image. Since only a single index print is typically provided per customer order, which generally ranges from 12–36 prints, the take-up mechanism 50 can easily accommodate for the slower speed of the digital printer printing system 14 and thereby avoid the necessity of slowing the printing rate of the optical printing system 12.

An appropriate sensor 54 is provided so that the photographic paper 26 can be properly located at the printing section 58 where the index print is formed. In the particular embodiment illustrated, the detection device 54 comprises a perforation detection sensor which detects perforations that have been made adjacent the printing section 58 of the optical printing system by perforation device 68. The perforations formed are used to identify and locate each of the images formed thereon by the optical printing system 12. After a particular order has been printed by the optical printing system 12, the photographic paper is advanced a sufficient amount such that the index print may be placed on the photographic paper adjacent the customer order prints at printing section 56.

In order to more thoroughly understand the present invention, a brief description of operation of apparatus 10 will now be discussed. In particular, supply reel 16 is advanced so as to cause a particular customer order to pass by the print gate 18 allowing exposure of each of the individual images for that particular customer order. Prior to arriving at the print gate 18, digital scanner 32 scans all the images and provides the appropriate exposure settings and corrections for exposing of the images at print gate 18. In addition, the scanner 32 sends the digital image information regarding all of the prints to the central processing unit 30 whereby this information is stored until all of the images of a particular customer order have been accumulated. After this has been done, the CPU 30 composes the images so as to form a single image onto AMLCD 34. As this is occurring, the photographic paper 26 that is being supplied by reel 28 is fed through the apparatus such that images are formed on the paper 26 at printing section 58 by optical print system 12. The perforation mechanism 68 provides an indication of the location of each of the images formed on the photographic paper 26. After the last image of a particular customer order has been formed on the photographic paper 26, the photographic paper 26 is advanced a sufficient length so that an index print may be placed on the photographic paper at printing section 56 by digital printing system 14 adjacent the last print in the customer order. The supply reel which supplies photographic paper 26 is run at a substantially constant rate so as to correspond to the rate of movement of the negatives in web 17. The photographic paper 26 passes through take-up mechanism 50 whereby the take-up loops 52 will either increase or decrease in size depending upon the action occurring at the printing section 56. Sensor 54 monitors the position and location of each image that has been produced on photographic paper 26. CPU 30, in combination with sensor 54, identifies when optical printing of a particular order has been completed and when the area of the photographic paper 26 which is to receive the index print is located at printing section 56 for exposure of the index image thereon. During the exposure of the index print at print section 56, the loops 52 will increase in size as the speed of the optical printing is faster than the rate at which the printing occurs by the digital printing system 14. After the index print has been formed on the photographic paper, drive 64 advances the paper 26 past print section 56 at a rate which reduces the take-up loops 52 and stops when the area of the paper 26 for receiving the next index image at printing section 56. Thus, it can be seen that the output of the high speed printer 10 is not affected and the index print can be produced in line with each customer order. This allows simplification of cutting of the images after it has left the printing section whereby all the images and the index print of a customer may be quickly and easily cut and collated so as to form a complete customer order.

Figure 2:
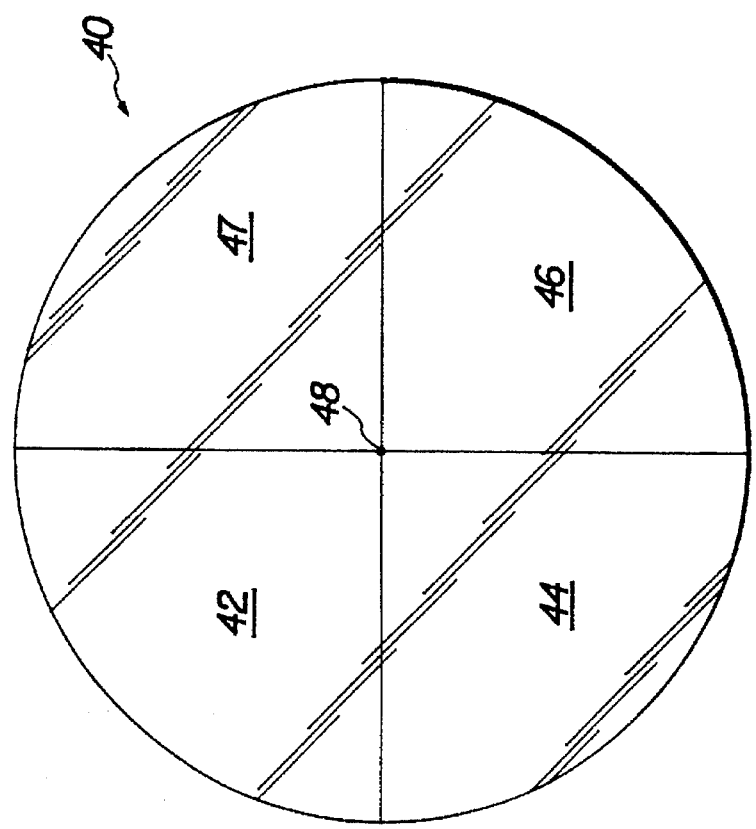
FIG. 2 is a top plan view of the filter wheel used in the apparatus of FIG. 1.

In the embodiment illustrated in FIGS. 1 and 2, a rotating filter wheel 40 is used to provide the three different colors of light. However, if desired, other techniques may be employed. In particular, referring to FIG. 3, there is illustrated a modified illumination technique that illuminates the photographic paper with each of the colored lights sequentially. In particular, there is illustrated three light sources 70, 72, 74. The three light sources 70, 72, 74 are positioned such that the illumination therefrom will be directed to an integrator 75 which will take the individual light from the three light sources and direct it in a single direction 77 toward the active matrix liquid crystal display 34. Associated with each of the light sources is a infrared cut-off filter 76. A blue pass filter 78 is provided in association with lamp 70, a red pass filter 80 is provided in association with lamp 72 and a green pass filter 82 is provided in association with lamp 74 so as to provide the desired three color light sources sequentially to integrator 75. This embodiment, avoids the need for rotation of a multicolored filter wheel. If desired, three AMLCD 34 can be used, one associated with each color source which will result in increasing the speed of print section 56 significantly.

Figure 3:
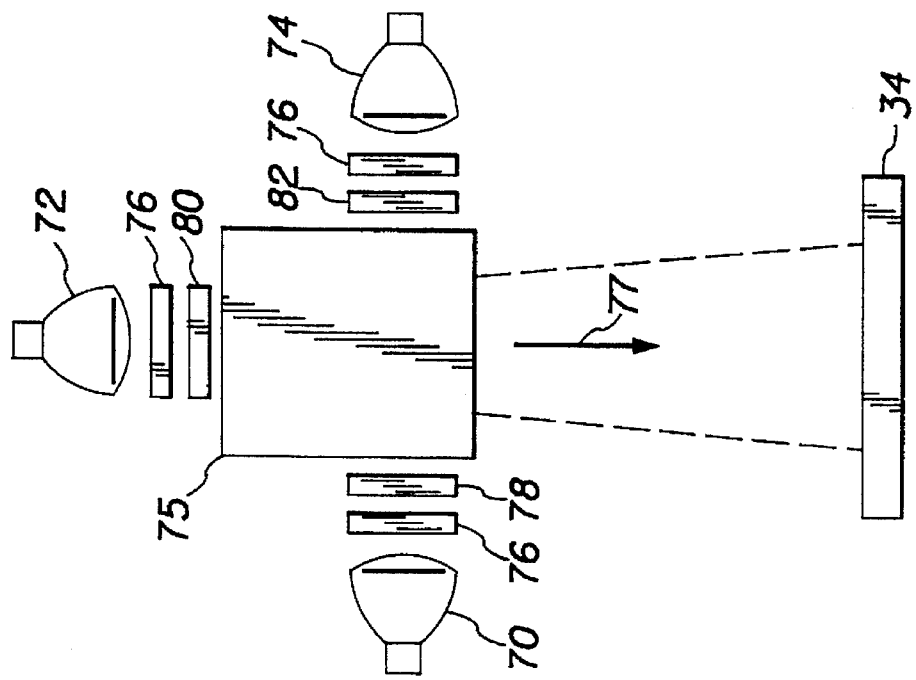
FIG. 3 is a schematic illustration of an alternate scheme for the digital printing portion of the apparatus of FIG. 1.

Referring to FIG. 4, there is illustrated an alternate light exposure system for use in the digital printing system 14 made according to the present invention, like numerals representing like parts and operation. In this embodiment, incident light is reflected onto the active matrix LCD 34 through lens 81 (as indicated by arrows 83) as opposed to being transmitted therethrough as illustrated in FIGS. 1 and 3.

The apparatus of FIGS. 1–4 is described as principally being used to provide in-line index prints. However, the digital printing system can also be used to add additional images/text adjacent the images previously formed by the optical printing system 12. By properly masking the photosensitive paper 26 during optical exposure, an area of the photosensitive material can be made available for later exposure by digital printing system 14, thus allowing the personalization of prints. This can be accomplished by using film supplied by the customer which has magnetically or optically encoded information. Alternatively, the information can be programmed in by any desired means.

In the embodiment illustrated in FIGS. 1–4, the digital printing system 14 is shown as a part of a combination optical digital high speed printer. Optionally, if desired, the digital printing system 18 may be used by itself to print all the prints with a totally separate device wherein digital image record files can be received on a single source, or from various locations for printing to a photosensitive material.

Figure 5:
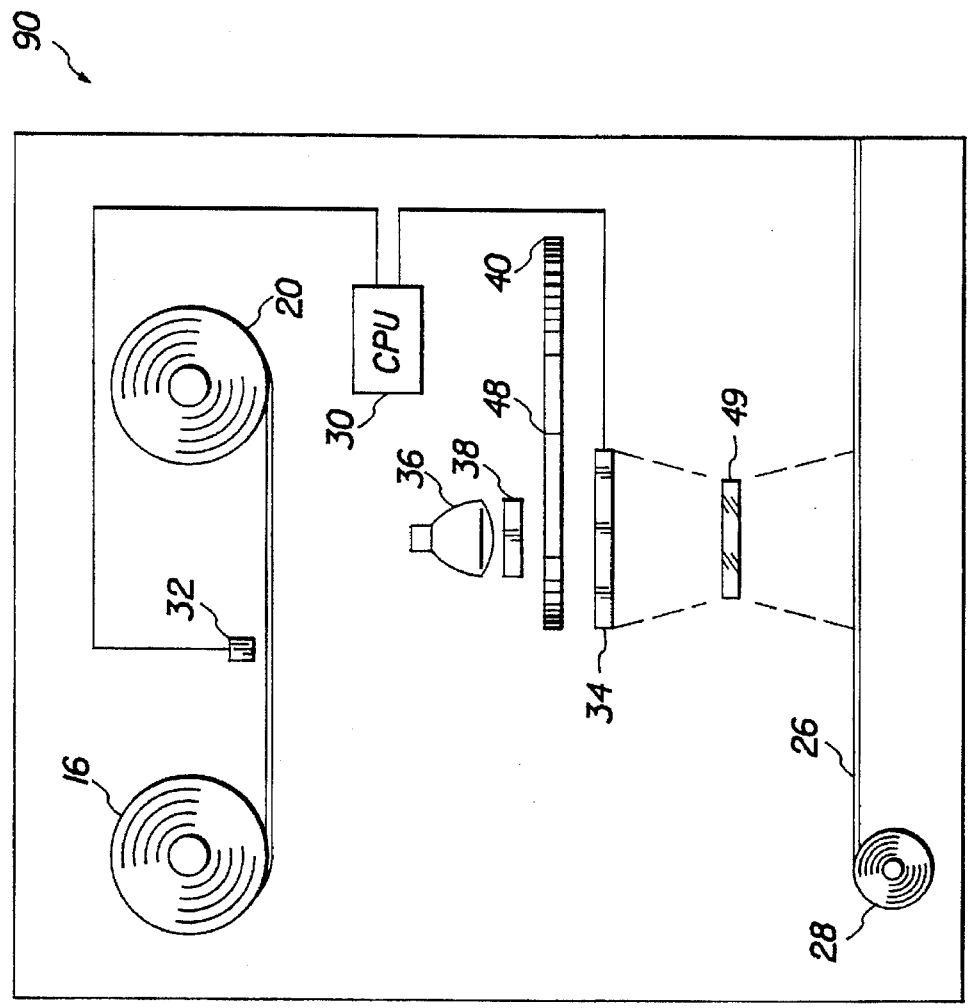
FIG. 5 is a diagrammatic representation of a modified apparatus made in accordance with present invention.

Referring to FIG. 5, there is illustrated a digital printer 90 similar to the apparatus of FIGS. 1–4, like numerals representing like parts, except that the optical printing system has been eliminated. In this embodiment the active matrix LCD 34 is used to form all the images, including the index print.

In order to improve the image quality of the print produce by the AMLCD 34, a microlens array 95 may be used in conjunction with the AMLCD 34 (see FIG. 6). FIG. 6 illustrates a modified AMLCD 34 made in accordance with the present invention. In a typical AMLCD, the individual LCD cells have associated with them a transistor and some interconnection lines. Typically these areas are masked so that the light is not distorted when it passes through these areas. Additionally the transistors must be masked because the are photo sensitive and light will activate them. A microlens array 95 is placed onto the light source side of the LCD as illustrated in FIG. 7. The microlens array 95 comprises a series of tiny lens, one associated with each pixel. These lens focus the light from the light source through the unmasked portion of the LCD cells. This greatly increases the effective aperture of the LCD cells resulting in a pixel with little or no masked portion on the viewing side of the LCD. This results in a higher quality image.

As can be seen, the present invention provides a high speed digital printer which produces high quality images at a relatively low cost.

It is to be understood that various other changes and modifications may be made without departing from the scope of the present invention, the present invention being limited by the following claims.

Parts List

10 . . . printing apparatus
12 . . . optical printing system
14 . . . digital printing system
16 . . . supply reel
17 . . . continuous web
18 . . . print gate
20 . . . take-up reel
22 . . . light source 24 ... lens
26 ... photosensitive material
28 ... reel
30 ... CPU
32 ... digital scanner
34 ... AMLCD
36 ... light source
38 ... infrared cut-off filter
40 ... colored filter wheel
42, 44, 46 ... filter sections
47 ... opaque section
48 ... axis
49 ... lens
50 ... take-up mechanism
52 ... take-up loops
54 ... sensor
58 ... printing section
64 ... drive
68 ... perforation mechanism
70, 72, 74 ... light sources
75 ... integrator
76 ... infrared cut-off filter
77 ... direction
78 ... blue pass filter
80 ... red pass filter
81 ... lens
82 ... green pass filter
83 ... arrow
90 ... digital printer
95 ... microlens array

We claim:

1. A high speed photographic printer comprising:
   a first optical printing system for exposing images from a negative film onto a continuous web of photosensitive material;
   a second digital printing system for exposing at least one image in-line on said web of photosensitive material, said digital printing system comprising:
      a scanner for obtaining a digital record of an image obtained from scanning said negative film;
      a monochromatic active matrix liquid crystal display capable of forming an image in accordance with said digital record; and
      an exposure system for exposing an image formed on said active matrix liquid crystal display onto said photosensitive material, said exposure system having filter means for producing a color image onto said photosensitive material, and a light source providing substantially uniform light across said active matrix liquid crystal display.

2. A high speed photographic printer according to claim 1 further comprising means for interspersal printing on said continuos web image from said second digital printing system with images made by said first optical printing system on said web.

3. A high speed photographic printer according to claim 1 further comprising means for printing on said continuos web by said second digital printing system which are closely associated with images made by said first optical printing system.

4. A high speed method for printing an index print in line with print of a single order on a photosensitive material, comprising the steps of:

a) scanning an image and creating a digital record representative of said image, said digital record produced by said scanner being designed to correspond to a predetermined number of pixels;
   b) sending said digital record to an active matrix liquid crystal display such that an digital image is produced thereon which corresponds to the original image scanned by said scanner, said active liquid crystal having a predetermined number of pixel elements and arrangement which corresponds directly to the number of pixels, size and arrangement of said scanner; and
   c) exposing said web by a first optical system so as to produce at least one image;
   d. exposing said digital image produced on said active matrix liquid crystal display onto a photosensitive material so as to form an image on said photosensitive material.

5. A method according to claim 4 wherein said digital record prior to being sent to active matrix liquid crystal display is manipulated so as to enhance or correct certain predetermined aspects of said original image.

6. A high speed photographic printer comprising:
   a first optical printing system for exposing images from a negative filmstrip onto a continous web of photosensitive material;
   a second digital printing system for exposing an image in-line on said web of photosensitive material, said digital printing system comprising:
      a scanner for obtaining a digital record of an image obtained from scanning said negative filmstrip;
      a monochromatic active matrix liquid crystal display capable of forming an image in accordance with said digital record; and
      an exposure system for exposing an image formed on said active matrix liquid crystal display onto said photosensitive material, said exposure system having filter means for producing a color image onto said photosensitive material, and a light source providing substantially uniform light across said active matrix liquid crystal display.

7. A high speed photographic printer according to claim 6 wherein said exposure system comprises a light source that provides a substantially uniform light across said active matrix liquid crystal display.

8. A high speed photographic printer according to claim 6 wherein said active matrix liquid crystal display has a 1 to 1 pixel ratio with respect to the scanner.

9. A high speed photographic printer according to claim 6 wherein said pixel elements produced by said scanner correspond directly to individual pixel elements of said active matrix liquid crystal display.

10. A high speed photographic printer according to claim 6 wherein said exposure system further comprises a filter wheel having a red, blue and green filter sections, said filter wheel being disposing between said light source and said photosensitive material so as to produce a color image on the photosensitive material.

11. A high speed photographic printer according to claim 6 wherein said active atrix liquid crystal display comprises a plurality of pixels and a micro lens array, one micro lens associated with each of said pixels of said active matrix liquid display.

* * * * *